United States Patent [19]
Kuroda

[11] Patent Number: 6,030,203
[45] Date of Patent: Feb. 29, 2000

[54] INJECTION UNIT FOR INJECTION MOLDING MACHINE

[75] Inventor: Hideo Kuroda, Aichi-ken, Japan

[73] Assignee: Mitsubishi Heavy Industries, Ltd., Tokyo, Japan

[21] Appl. No.: 09/026,679

[22] Filed: Feb. 20, 1998

[30] Foreign Application Priority Data

Feb. 27, 1997 [JP] Japan .................................... 9-044347

[51] Int. Cl.⁷ .................................................. B29C 45/46
[52] U.S. Cl. .............................. 425/561; 366/75; 366/77; 366/98; 425/561
[58] Field of Search ................................ 425/203, 205, 425/207, 584, 585, 587, 561; 366/75, 77, 98; 264/328.17, 328.19

[56] References Cited

U.S. PATENT DOCUMENTS

| | | |
|---|---|---|
| 485,282 | 11/1892 | Lang . |
| 2,309,729 | 2/1943 | Gordon ............................ 264/328.19 |
| 2,505,540 | 4/1950 | Goldhard . |
| 2,895,645 | 7/1959 | Pelak . |
| 3,045,283 | 7/1962 | Keiser . |
| 3,259,374 | 7/1966 | Doebl et al. . |
| 3,723,037 | 3/1973 | Formo . |
| 5,030,080 | 7/1991 | Fukuda et al. ........................ 425/587 |
| 5,102,326 | 4/1992 | Bacher et al. ......................... 425/203 |
| 5,413,475 | 5/1995 | Murata et al. ......................... 425/205 |
| 5,795,601 | 8/1998 | Yamada et al. ........................ 425/584 |

FOREIGN PATENT DOCUMENTS

4-163015  6/1992  Japan .

*Primary Examiner*—Jill L. Heitbrink
*Attorney, Agent, or Firm*—Armstrong, Westerman, Hattori, McLeland and Naughton

[57] ABSTRACT

This invention relates to an injection unit for an injection molding machine, which is free of inconvenience such as a reduction in ability and clogging of a powdery filler upon molding a powdery-filler-added resin, can prevent cutting of long fibers upon molding a long-fiber-filled resin, can also be applied to feed resins which give off evaporated gas, can be used for a wide variety of resins, and can be constructed with a substantially-reduced machine length. The injection unit is therefore constructed of a tank and an injection cylinder. The tank has a built-in mixing rod with numerous fins extending from the mixing rod, whereby a feed resin is plasticized by rotation of the mixing rod. The injection cylinder is connected with the tank and has a built-in injection plunger, whereby a molten resin fed from the tank is injected into a mold by the injection plunger. The injection unit according to this invention is useful especially upon a feed resin, such as a powdery-filler-added resin or a long-fiber-filled resin, for injecting the thus-fed resin into a mold.

10 Claims, 12 Drawing Sheets

INJECTION UNIT FOR INJECTION MOLDING MACHINE

BACKGROUND OF THE INVENTION

1. Field of the Invention

This invention relates to an injection unit for plasticizing a feed resin and injecting it into a mold in an injection molding machine for plastics, and especially to an injection unit suited for the injection molding of feed resins, such as powdery-filler-added resins and long-fiber-filled resins.

2. Description of the Related Art

Figure 12:
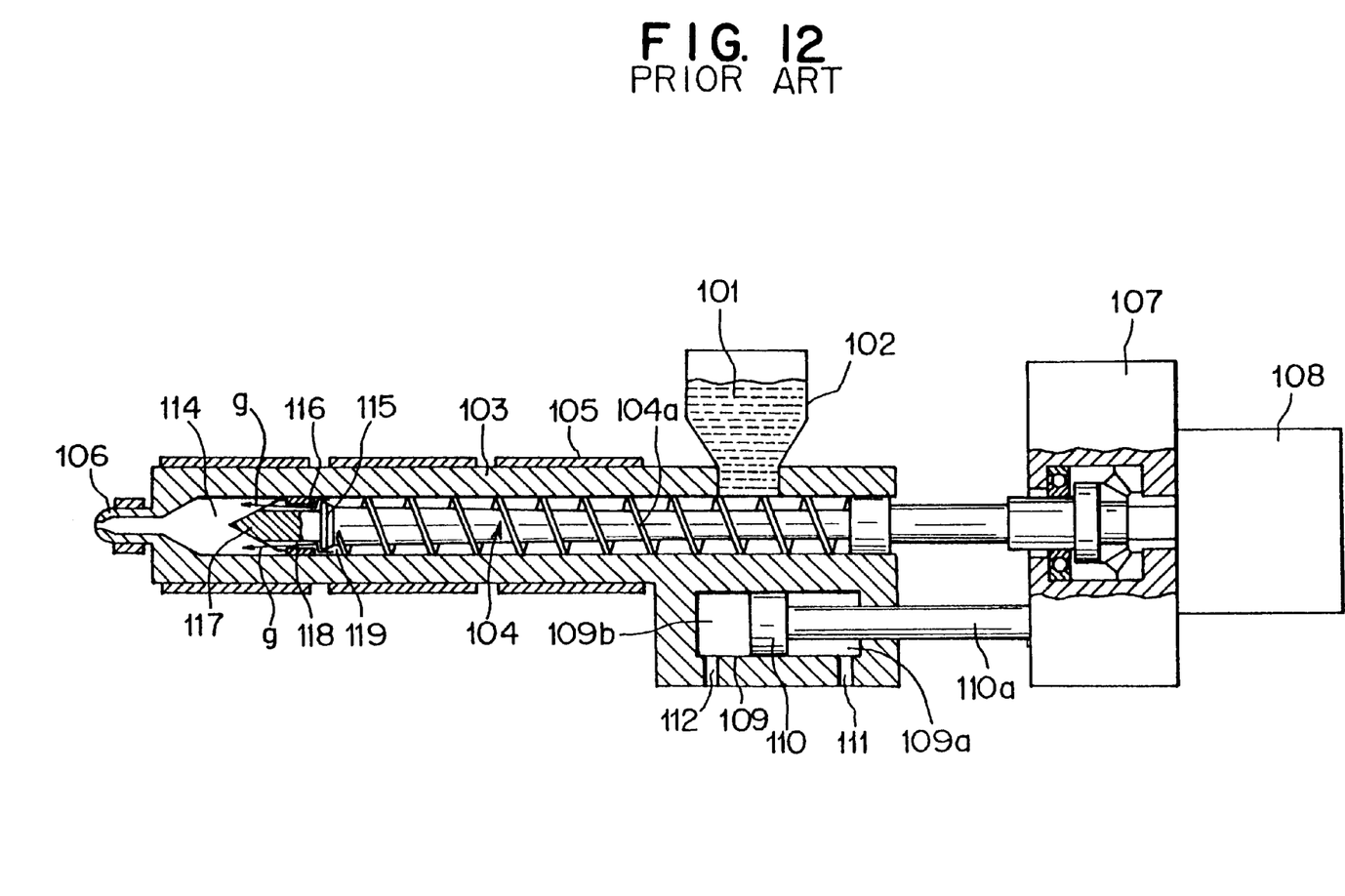
FIG. 12 is the cross-sectional view schematically illustrating the overall construction of the conventional injection unit in the injection molding machine.

FIG. 12 is a cross-sectional view schematically illustrating the overall construction of a conventional injection unit in an injection molding machine. As is depicted in FIG. 12, the injection unit is constructed of a hopper 102, an injection cylinder 103, a plasticizing screw 104, a heater 105, a nozzle 106, a bearing box 107, a motor 108 and a hydraulic cylinder 109.

Here, the hopper 102 serves to store therein a feed resin 101 which is to be fed into the injection cylinder 103. The injection cylinder 103 internally holds the plasticizing screw 104 so that the plasticizing screw 104 is rotatable and also slidable in a forward/rearward direction (an axial direction, i.e., a horizontal direction as viewed in FIG. 12), and at a free end (forward end) of the injection cylinder, a nozzle 106 is formed for injecting the molten and plasticized feed resin (molten resin) into an unillustrated mold.

The plasticizing screw 104 is provided on an outer periphery thereof with a screw flight 104a for feeding the feed resin 101 forward and, at a basal end portion thereof, is rotatably supported by the bearing box 107 and is connected to the motor 108. The plasticizing screw 104 is driven by the motor 108 to feed the feed resin 101 forward (in the leftward direction in FIG. 12) from the hopper 102 while plasticizing the resin.

On a side of a free end (on a side of a free end forward of the screw flight 104a) of the plasticizing screw 104, a seat 115 and a screw tip 117 are formed and a check ring 116 is arranged.

In general, it is necessary for the injection unit to provide on the side of the free end of the plasticizing screw 104 with a function as a check valve that allows a molten resin 114 to pass to a forward part of the plasticizing screw 104 during a plasticizing step and, upon injection, prevents a reverse flow of the molten resin 114 to inject the molten resin 114 in a quantity corresponding to the volume of a product to be molded. In the conventional injection unit shown in FIG. 12, this function is exhibited by the check ring 116 and the seat 115.

Specifically, the check ring 116 is arranged on the outer periphery of the screw tip 117 in such a way that a space 118 is left between the check ring 116 and the screw tip 117, the check ring 116 is slidable relative to the screw tip 117 and, upon injection, the check ring 116 is brought at a rearward end thereof into contact with the seat 115 formed on the outer periphery of the plasticizing screw 104 so that the resin is prevented from flowing backward.

In addition, the check ring 116 is fitted so that the check ring 116 is in contact with an inner peripheral wall of the injection cylinder 103 and is rotatable and slidable along the inner peripheral wall. An outer diameter of the seat 115 is set smaller than an inner diameter of the injection cylinder 103 so that a clearance 119 is formed between an outer periphery of the seat 115 and the inner peripheral wall of the injection cylinder 103. The seat 115 and the check ring 116 are arranged so that they rotate together with the screw tip 117 during rotation of the plasticizing screw 104. During a plasticizing step, the above-mentioned space 118 and clearance 119, as will be described subsequently herein, also function as flow passages through which the molten and plasticized resin passes.

The heater 105 is disposed on the outer periphery of the injection cylinder 103 to heat the resin which is being rotated by the plasticizing screw 104 (the screw flight 104a) within the injection cylinder 103. The hydraulic cylinder 109 is formed integrally with the injection cylinder 103, and causes the plasticizing screw 104, the bearing box 107 and the motor 108 to move in the axial direction of the screw (the forward/rearward direction) relative to the injection cylinder 103.

Within the hydraulic cylinder 109, a hydraulic piston 110 which is fixed to the bearing box 107 via a rod 110a is held slidably in the forward/rearward direction. By supplying hydraulic fluid to a fluid compartment 109a on a rearward side of the hydraulic piston 110 through a port 111 from an unillustrated hydraulic fluid supplying system, the plasticizing screw 104 is caused to advance relative to the injection cylinder 103. By supplying hydraulic fluid to a fluid compartment 109b on a forward side of the hydraulic piston 110 through a port 112 from the unillustrated hydraulic fluid supplying system, on the other hand, the plasticizing screw 104 is caused to retreat relative to the injection cylinder 103.

In the conventional injection unit constructed as described above, the feed resin 101 is supplied from the hopper 102 to the outer periphery of the plasticizing screw 104 (screw flight 104a) within the injection cylinder 103, is molten and plasticized under heating by the heater 105 and also under rotation by the plasticizing screw 104, is fed to a point forward of the plasticizing screw 104. At this time, the feed resin is allowed to pass through the clearance 119 and space 118 as indicated by streamlines g, and is then stored as the molten resin 114 on a side forward of the screw tip 117. During such a plasticizing step, a space is maintained between the check ring 116 and the seat 115 as shown in FIG. 12.

By a forward movement of the plasticizing screw 104, the molten resin 114 is injected into the unillustrated mold through the nozzle 6, and is then cooled and solidified into a molded product. During such an injection step, hydraulic fluid is supplied to the fluid compartment 109a in the hydraulic cylinder 109 through the port 111. The hydraulic piston 110 is hence caused to advance relative to the injection cylinder 103, in other words, the plasticizing screw 104 is thus caused to advance relative to the injection cylinder 103, whereby the molten resin 114 is injected through the nozzle 106.

At this time, the check ring 116 is pushed rearward by reaction force of the molten resin 114, so that the check ring 116 is brought into close contact with the seat 115 to eliminate the space between the check ring 116 and the seat 115. It is therefore possible to prevent the molten resin 114 from flowing backward toward the screw flight 104a of the plasticizing screw 104 so that, upon injection, the molten resin 114 can be injected in a quantity corresponding to the volume of a product to be molded.

According to the above-described conventional injection unit, however, the plasticizing resin is fed to a point forward of the screw tip 117 through a narrow passage (the space 118) inside the check ring 116, which functions as a check valve, as indicated by the streamlines g when fed to the forward part of the plasticizing screw 104. The resin which is flowing through the flow passage therefore encounters significant flow resistance. Problems such as those to be described next may therefore arise when a resin filled with a powdery filler, such as woodflour or coal ash or a resin filled with long fibers is used.

In the case of the resin filled with the powdery filler, the resin-feeding ability of the plasticizing screw 104 is lowered due to the inclusion of the powdery filler compared with ordinary pellet-like resins, so that the plasticizing ability may be substantially reduced. Further, the narrow flow passage inside the check ring 116 may be clogged by the powdery filler, thereby making it impossible to continue the molding.

In the case of the resin filled with the long fibers, the fibers may be cut into shorter fibers due to shearing action within a screw channel formed by the screw flight 104a on the outer periphery of the plasticizing screw 104 and also due to flow resistance within the narrow flow passage inside the check ring 116. The strength-improving effect of the long fibers for the molded product is hence reduced.

Further, use of a feed resin containing a component, which evaporates into gas upon plasticizing like pyrolignous acid in woodflour, may lead to occurrence of a defect, such as bubbles or burn marks, in the molded product (due to compression by the gas). With a view to avoiding the occurrence of gas in such a plasticizing step, it may be contemplated to preheat and dry the molding feed resin at a high temperature. This preheating, however, requires extra time and expense and are therefore not preferred.

According to the conventional unit shown in FIG. 12, the feed resin 101 is plasticizing while being fed forward by rotation of the plasticizing screw 104. Depending on the type of the resin, there is a potential problem that, before the feed resin 101 is fully molten, it may be fed into the molten resin 114 and may then be injected in a still unmolten form. It is therefore difficult to mold a wide variety of resins by using the same plasticizing screw 104. Screws of different shapes must hence be employed for resins of different types, such as general-purpose resins (polypropylene, polystyrene, and the like), high-viscosity resins and vinyl chloride resin, respectively.

The plasticizing of the feed resin 101 must be completed before the resin is fed to the point forward of the plasticizing screw 104 (screw tip 117), and the molten resin 114 must be accumulated in a predetermined quantity at the point forward of the plasticizing screw 104. Accordingly, a screw length about 20 times as much as a screw diameter is needed, and the injection unit has a longer machine length. This has led to a problem that an extra installation space is required accordingly.

Incidentally, JP Kokai 4-163015, for example, discloses a technique that a discrete plasticizing unit is attached to an injection cylinder and a molten resin plasticized by the plasticizing unit is fed to a point forward of an injection plunger within an injection cylinder. This technique has made it possible to provide an injection unit with a shorter machine length. In the plasticizing unit, a screw provided with a continuous flight is used and performs substantially the same function as conventional plasticizing screws. Namely, whenever the screw of the plasticizing unit rotates, the resin is fed toward the injection cylinder. Therefore, a time until the resin is fed into the injection cylinder along an outer periphery of the screw is a plasticizing time, which cannot be set as desired. In the case of a short screw length, the plasticizing time is not sufficient so that the melting of the resin is insufficient. The unmolten resin may be fed into the injection cylinder, and may be injected as is.

SUMMARY OF THE INVENTION

The present invention has been created in view of the foregoing problems. It is therefore an object of the present invention to provide an injection unit for an injection molding machine, which is free of inconvenience such as a reduction in plasticizing ability and clogging of a powdery filler upon molding a powdery-filler-added resin, can prevent cutting of long fibers upon molding a long-fiber-filled resin, can also be applied to mold resins which give off evaporated gas, can be used for a wide variety of resins without needing screws of different shapes, and can be constructed with a substantially-reduced machine length.

Therefore, an injection unit according to the present invention, which is for an injection molding machine, comprises a plasticizing tank having a built-in mixing rod with numerous fins arranged extending from the mixing rod, whereby a feed resin is plasticized by rotation of the mixing rod; and an injection cylinder connected with the plasticizing tank and having a built-in injection plunger, whereby a molten resin fed from the plasticizing tank is injected into a mold by the injection plunger.

In the above injection unit, the plasticizing tank may be provided with a vent hole in an upper part thereof, and a communication passage, which extends from the plasticizing tank to the injection cylinder may be opened and closed by the injection plunger.

Upon plasticizing, the mixing rod may be rotated so that the numerous fins feed the feed resin in a direction opposite to the injection cylinder, and, upon feeding the molten resin from the plasticizing tank into the injection cylinder, the mixing rod may be rotated so that the numerous fins feed the molten resin toward the injection cylinder.

Further, upon plasticizing, the mixing rod may be rotated in a direction so that the numerous fins feed the molten resin from the plasticizing tank into the injection cylinder with the communication passage being closed by the injection plunger.

According to the injection unit of this invention for the injection molding machine, the extremely simple construction that the plasticizing tank having the built-in mixing rod with numerous fins arranged extending from the mixing rod is connected to the injection cylinder can plasticize and melt the feed resin within the plasticizing tank without feeding it toward the injection cylinder and can feed the resin into the injection cylinder only after melting it within the plasticizing tank while mixing it there by the mixing rod for a desired time.

The injection unit according to this invention therefore does not require such a plasticizing screw as that needed to date, and can eliminate a part of large flow resistance, such as a check ring, from a flow passage through which a resin flows subsequent to its plasticizing. In the case of a resin added with a powdery filler, the powdery filler neither clogs the resin flow passage nor lowers the plasticizing ability. It is therefore possible to easily plasticizing a feed resin even when the feed resin contains a lot of powder, such as woodflour or coal ash. The injection unit according to the present invention therefore makes it possible to use a feed resin containing a powdery filler at a high concentration, the injection molding of which has heretofore been difficult, thereby bringing about advantageous effects that the feed resin cost can be reduced and the physical properties of a molded product can be significantly improved.

In the case of a resin filled with long fibers, on the other hand, the long fibers are not subjected to such shear force as that applied by a conventional plasticizing screw and, moreover, do not encounter such flow resistance as that caused by a check ring or the like. It is therefore possible to avoid cutting of the long fibers. A resulting molded product hence contains long fibers in an increased proportion, thereby providing the molded product with significantly improved strength.

The injection unit according to the present invention permits easy molding of a feed resin added with a powdery filler at a high concentration or a feed resin filled with long fibers as described above, although such a resin causes one or more problems when it is processed by conventional injection units. The injection unit according to the present invention therefore makes it possible to use a feed resin of lower cost than the conventional injection units, thereby permitting a substantial reduction in the cost of a product. In addition, the injection unit according to the present invention is suited for molding a resin added with a powdery filler. Accordingly, it can also be used, without problems, upon molding a raw material which is available by crushing resin products, thereby facilitating recycling of feed resins.

Because plasticizing can be performed for a desired time within the plasticizing tank as described above, it is possible to conduct plasticizing for a period as long as needed according to a resin even if the resin is replaced by another resin of different type. It is therefore no longer necessary to change a part of the unit according to the resin type and, moreover, to use such a long screw as that needed to date. This has made it possible to shorten the injection cylinder and hence to substantially reduce the machine length of the injection unit, thereby bringing about a still further advantageous effect that a space required for the installation of the unit can be reduced.

Further, the provision of the vent hole in the upper part of the plasticizing tank makes it possible to release evaporated gas, which occurs upon plasticizing, to the outside through the vent hole. It is therefore possible to assure avoidance of occurrence of defects, such as bubbles and/or burn marks, on a molded product even when a feed resin containing a gas-evaporating component such as woodflour is used.

The opening/closing control of the communication passage, which extends from the plasticizing tank to the injection cylinder, by the injection plunger makes it possible to close the flow passage by the injection plunger upon plasticizing so that the resin inside the plasticizing tank can be plasticized for a period as long as desired without feeding it to the injection cylinder and, after the plasticizing, to open the flow passage so that the resin can be readily fed from the plasticizing tank into the injection cylinder to perform injection molding without problems.

Moreover, the rotation of the mixing rod in the manner that the fins feed the resin in the direction opposite to the injection cylinder upon plasticizing and the fins feed the molten resin toward the injection cylinder upon feeding the molten resin from the plasticizing tank into the injection cylinder makes it possible to maintain a balance during plasticizing between upward feeding of the resin by the fins and a downward reverse flow of the resin through spaces between the fins so that the resin can be adequately mixed, and also makes it possible to reverse the mixing rod after the plasticizing so that the resin can be easily fed from the plasticizing tank into the injection cylinder by the action of the fins.

The rotation of the mixing rod, with the communication passage closed by the injection plunger, during plasticizing in the direction that the molten resin can be fed from the plasticizing tank into the injection cylinder can increase the resin pressure, thereby making it possible to surely avoid the production of evaporated gas in the resin or the formation of bubbles in the resin due to mixing of the external air.

DESCRIPTION OF THE PREFERRED EMBODIMENTS

The embodiments of the present invention will hereinafter be described with reference to the drawings.

Figure 1:
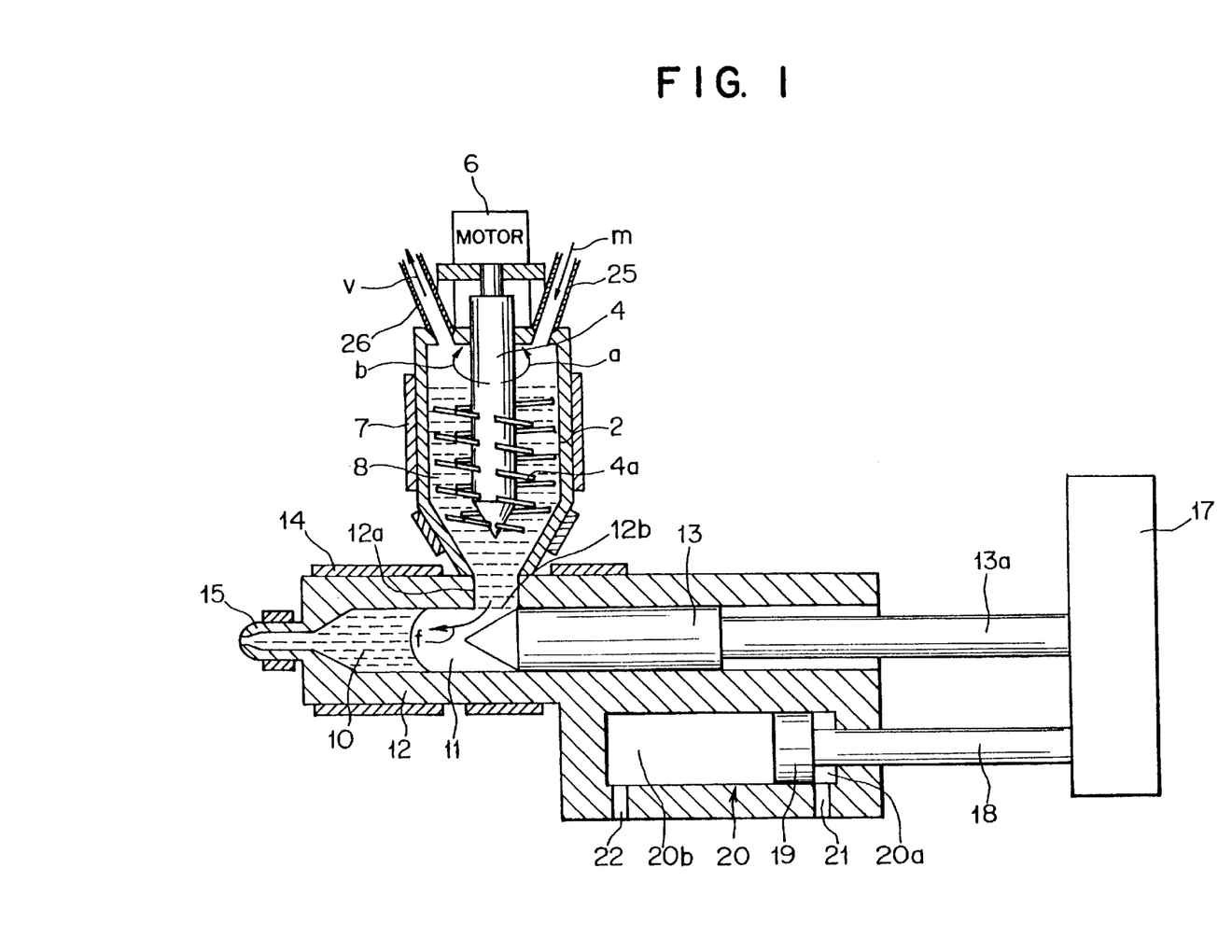
FIG. 1 is a cross-sectional view showing an injection unit according to one embodiment of the present invention for an injection molding machine.
Figure 2:
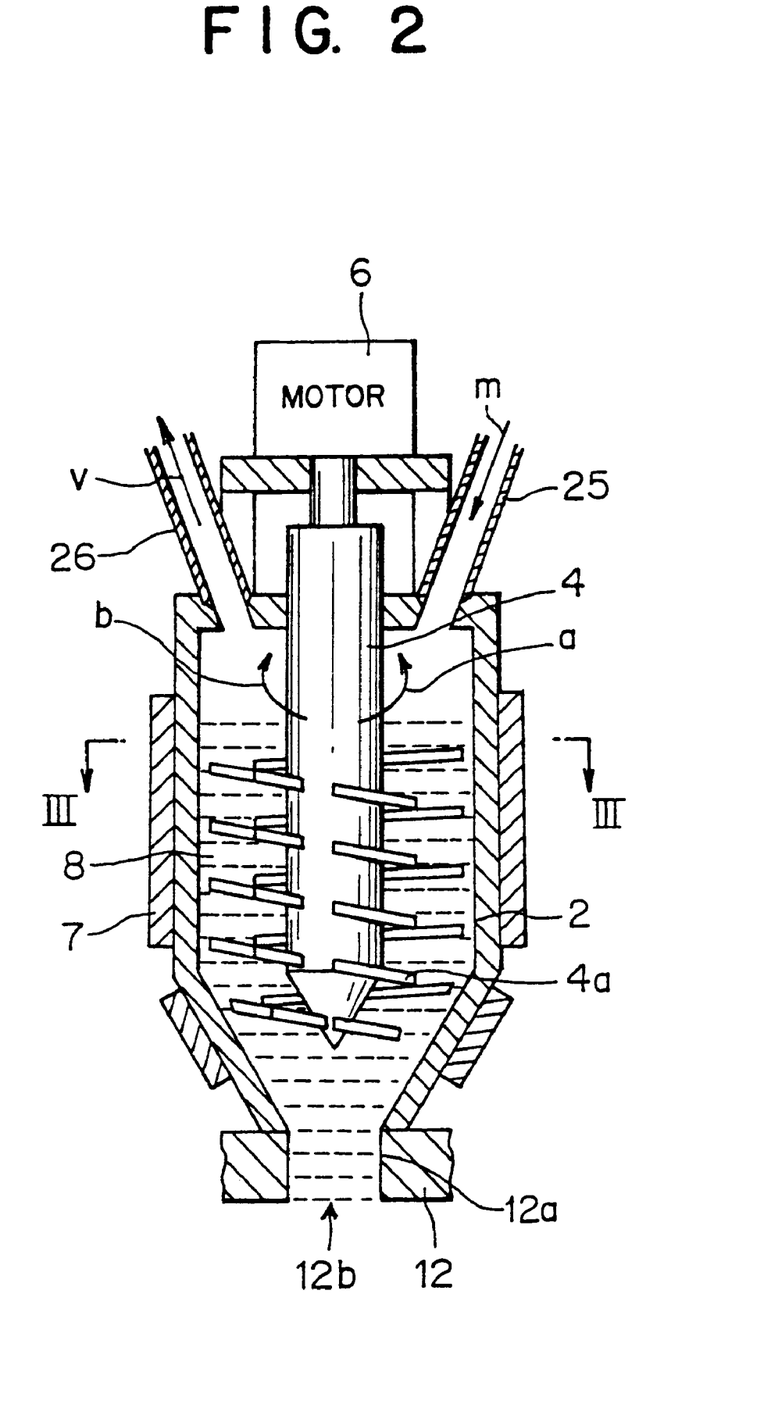
FIG. 2 is a cross-sectional view illustrating an essential part (plasticizing tank) of the embodiment.
Figure 3:
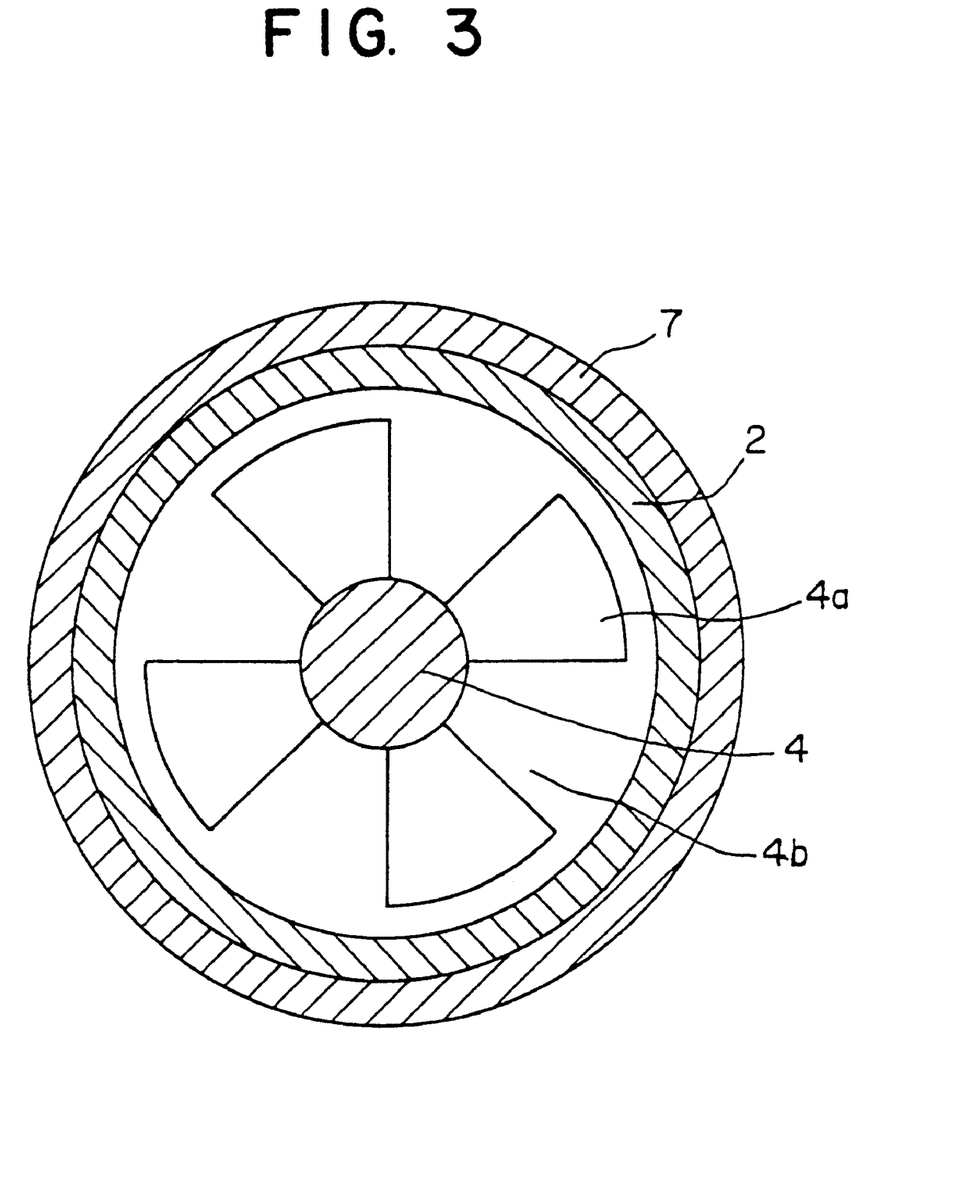
FIG. 3 is a cross-sectional view taken in the direction of arrows III—III of FIG. 2.

As is illustrated in FIG. 1 through FIG. 3, the injection unit according to this embodiment is constructed of a plasticizing tank 2, a mixing rod 4, an injection cylinder 12, an injection plunger 13, a connecting plate 17, a rod 18, a hydraulic piston 19, a hydraulic cylinder 20, and the like.

In this embodiment, the plasticizing tank 2 has such a cylindrical shape, as formed, so that it is progressively reduced in diameter in a lower end portion thereof, and is provided with the mixing rod 4 built in along a vertical direction and also with a heater 7 mounted on an outer peripheral part thereof. On an outer peripheral wall of the mixing rod 4, numerous helical fins 4a are arranged at intervals therebetween so that they extend from the mixing rod 4. As is shown in FIG. 3, cut-off portions (spaces) 4b are formed between the adjacent helical fins 4a. Incidentally, the numerous helical fins 4a may also be formed by forming the cut-off portions 4b at intervals in a continuous helical fin (continuous flight) arranged extending from the outer peripheral wall of the mixing rod 4.

In addition, a motor 6 is connected to an upper end of the mixing rod 4 so that the mixing rod 4 can be driven in either direction, which are indicated by arrows a,b, by the motor 6. Further, the plasticizing tank 2 is provided at an upper part thereof with a feed pipe 25 for feeding a feed resin batchwise into the plasticizing tank 2, as indicated by arrow m, and also with a vent pipe (vent hole) 26 for releasing evaporated gas to the outside, as indicated by arrow v.

The injection cylinder 12 houses the injection plunger 13 slidably in a forward/rearward direction (an axial direction, i.e., a horizontal direction as viewed in FIG. 1) and is provided on an outer peripheral part thereof with a heater 14. As will be described below, the injection plunger 13 is driven in the forward/rearward direction by the hydraulic cylinder 20 while being maintained in close contact with an inner peripheral wall of the injection cylinder 12.

To the injection cylinder 12, the above-described plasticizing tank 2 is connected so that its axial direction crosses the axial direction of the injection cylinder 12 (the sliding direction of the injection plunger) at right angles. The point of their connection is located within a range over which the injection plunger 13 moves, and an interior of the plasticizing tank 2 and that of the injection cylinder 12 are communicated with each other through a communication passage 12a formed in an upper wall portion of the injection cylinder 12.

This embodiment is therefore constructed so that a resin inlet 12b of the communication passage 12a, which is open into the injection cylinder 12, is opened or closed depending on the position of the injection plunger 13 and the injection plunger 13 hence opens and closes the communication passage 12a extending from the plasticizing tank 2 to the injection cylinder 12.

Within the injection cylinder 12, a molten resin 10 which has been fed from the plasticizing tank 2, is accumulated in an empty space formed forward of the injection plunger 13, and a nozzle 15 is formed through a free end (forward end) of the injection cylinder 12 to inject the thus-accumulated molten resin 10 into a mold (not shown) by an operation of the injection plunger 13.

The hydraulic cylinder 20 is formed integrally with the injection cylinder 12, and serves to move the injection plunger 13 in the axial direction (in the forward/rearward direction) relative to the injection cylinder 12 so that an injection operation is performed. The injection plunger 13 is fixed on the connecting plate 17 via an injection ram 13a which is coaxially connected to a rearward end of the injection plunger 13.

Further, the hydraulic piston 19 is held slidably in a forward/rearward direction within the hydraulic cylinder 20. This hydraulic piston 19 is connected to the connecting plate 17 via the rod 18 which is arranged in parallel with the injection ram 13a. Accordingly, the injection plunger 13 and the hydraulic piston 19 are integrally connected with each other via the injection ram 13a, the connecting plate 17 and the rod 18.

A supply of hydraulic fluid from a hydraulic fluid supply system (not shown) to a fluid compartment 20a on a rearward side of the hydraulic piston 19 through a port (fluid port) 21 causes the injection plunger 13 to advance relative to the injection cylinder 12, while a supply of hydraulic fluid from the fluid supply system to a fluid compartment 20b on a forward side of the hydraulic piston 19 through a port (fluid port) 22 causes the injection plunger 13 to retreat relative to the injection cylinder 12.

About an operation of the injection unit of the this embodiment constructed as described above, a description will be made in brief with reference to FIG. 1. A feed resin is intermittently fed from the feed pipe 25 into the plasticizing tank 2 and is stored there as a plasticizing resin 8. The plasticizing resin 8 is mixed and made molten while being heated by the heater 7 and also being agitated by the helical fins 4a of the mixing rod 4 driven by the motor 6. During this time, the resin inlet 12b remains closed by the injection plunger 13, as will be described subsequently with reference to FIG. 4. Incidentally, specific operations of the plasticizing tank 2 and the mixing rod 4 will also be described subsequently with reference to FIG. 2 and FIG. 3.

The resin 8, which has been plasticized in the plasticizing tank 2, is transferred into the empty space 11 within the injection cylinder 12 by way of the communication passage 12a and resin inlet 12b of the injection cylinder 12, as indicated by arrow f, and is accumulated as the molten resin 10 at a point forward of the injection plunger 13. The molten resin 10 accumulated in the injection cylinder 12 is controlled at a constant temperature by the heater 14 on the outer periphery part of the injection cylinder 12. By a forward operation of the injection plunger 13, the molten resin 10 is injected into an unillustrated mold through the nozzle 15, and is then cooled and solidified into a product.

Referring next to FIG. 2 and FIG. 3, the operations of the plasticizing tank 2 and the mixing rod 4 will be described in detail.

As is shown in FIG. 2 and FIG. 3, the mixing rod 4 built in the plasticizing tank 2 is provided with the helical fins 4a, so inclined that upward feeding force acts on the resin 8 when the mixing rod 4 rotates in the direction of arrow a (a plasticizing direction) but downward feeding force acts on the resin 8 when the mixing rod 4 rotates in the direction of arrow b.

The helical fins 4a are not continuous but, as is shown in FIG. 3, the cut-off portions (spaces) 4b are formed between the adjacent ones of the numerous helical fins 4a. The resin 8, which is about to be fed upwards owing to the rotation of the mixing rod 4 in the direction of arrow a during plasticizing, therefore falls downwards through the cut-off portions 4b under the action of gravity, whereby the resin 8 is mixed and agitated within the plasticizing tank 2.

In other words, the resin does not flow out of the plasticizing tank 2 upon plasticizing so that the resin 8 can be made molten there by heating it with the heater 7 for a period as long as desired. Since the resin 8 is agitated by the mixing rod 4 during this period, transfer of heat across the resin 8 is promoted so that the resin 8 is made molten evenly. Even if a feed resin containing a lot of a powdery filler, such as woodflour or coal ash, is used, the resin is heated under agitation, thereby permitting easy melting of the resin without problems.

Further, the rotation speed of the mixing rod 4 can be controlled at will, so that force which acts on the resin 8 can be reduced by lowering the rotation speed. When a resin filled with long fibers is used, rotation of the mixing rod 4 at a lowered speed during plasticizing therefore can reduce the force acting on the fibers to assure avoidance of cutting of the fibers.

Incidentally, the feeding of the feed resin into the plasticizing tank 2 is intermittently conducted through the feed pipe 25, as indicated by arrow m in FIG. 2. This is to feed the feed resin slowly in view of a falling time of the resin and only in a quantity not exceeding the capacity of the plasticizing tank 2 so that the feed resin is prevented from overflowing to the outside from the plasticizing tank 2.

On the other hand, woodflour gives off pyrolignous acid gas when it is heated, and general resins may also produce water, organic gas, and the like, when heated. They may cause defects, such as bubbles and burn marks, on molded products. To cope with this problem, the vent pipe 26 is arranged in the upper part of the plasticizing tank 2, as shown 2. Through this vent pipe 26, evaporated gas can be released into the atmospheric air, as indicated by arrow V. The injection unit may be designed to forcedly eliminate evaporated gas in such a case by connecting a vacuum pump (not shown), or the like to the vent pipe 26 and evacuating the plasticizing tank 2.

When it is desired to deliver the plasticized resin 8 downwardly (into the injection cylinder 12) through a bottom of the tank, the mixing rod 4 is rotated in the direction of arrow b to downwardly push the resin 8 under the action of the helical fins 4a. Although there are cut-off portions (spaces) 4b between the adjacent fins 4a as shown in FIG. 3, the gravity acts downwardly on the resin 8 so that the resin 8 is allowed to flow downwardly at this time without flowing backward, i.e., upward through the cut-off portions 4b. In FIG. 3, four helical fins 4a are arranged per full turn. The number of helical fins may however be 2, 3, or 5, or greater, per full turn, and a desired number of helical fins can be arranged. Further, the size of the cut-off portions (spaces) 4b between the adjacent fins 4a can be determined as desired.

With reference to FIG. 4 through FIG. 7, a description will next be made about a positional relationship of the injection plunger 13 with individual steps of injection molding performed by the injection unit of this embodiment.

Figure 4:
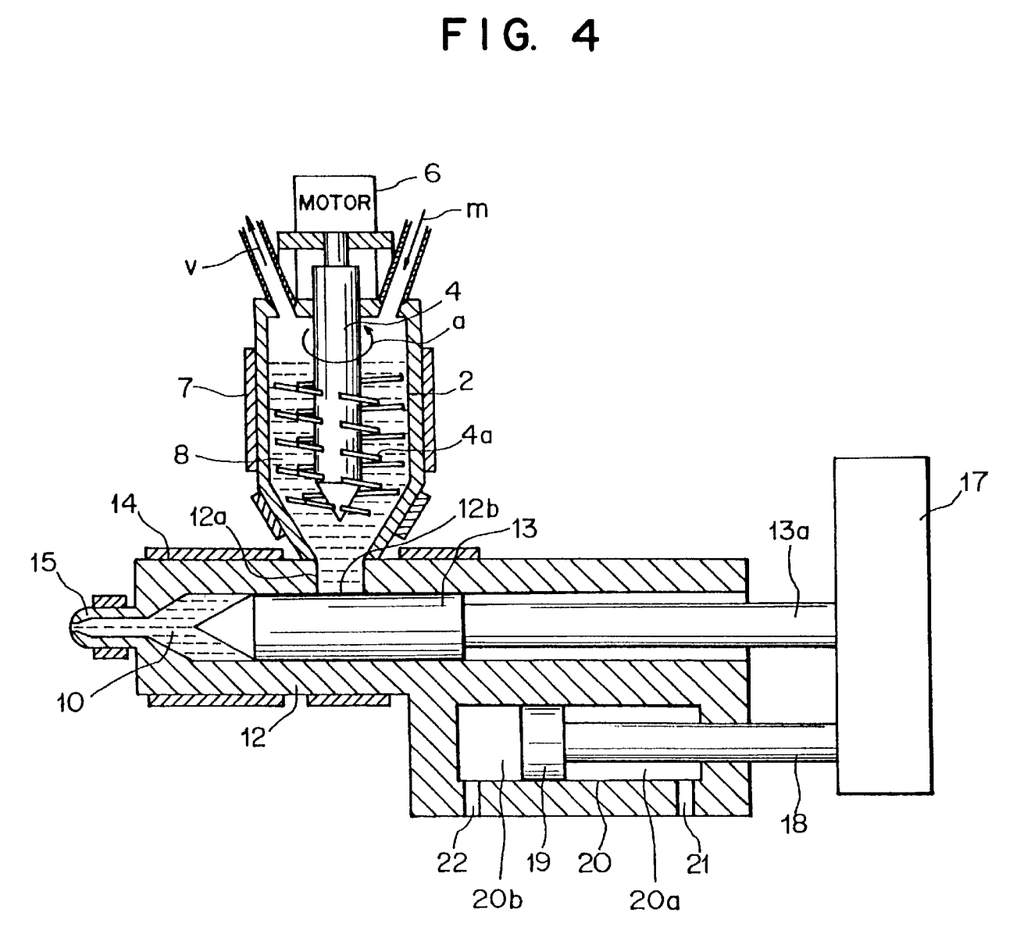
FIG. 4 is a cross-sectional view illustrating a state during plasticizing in the injection unit according to the embodiment.

Firstly, FIG. 4 illustrates a plasticizing step. As is shown in FIG. 4, the injection plunger 13 is at an advanced position and the resin inlet 12b is closed by the outer peripheral part of the injection plunger 13, so that the resin 8 inside the plasticizing tank 2 does not flow into the injection cylinder 12. In this state, the mixing rod 4 is therefore driven by the motor 6 in the direction of arrow a for a desired time so that the helical fins 4a feed the resin 8 in the direction opposite to the injection cylinder 12 (in the upward direction). The resin 8 can therefore be plasticized under mixing.

Figure 5:
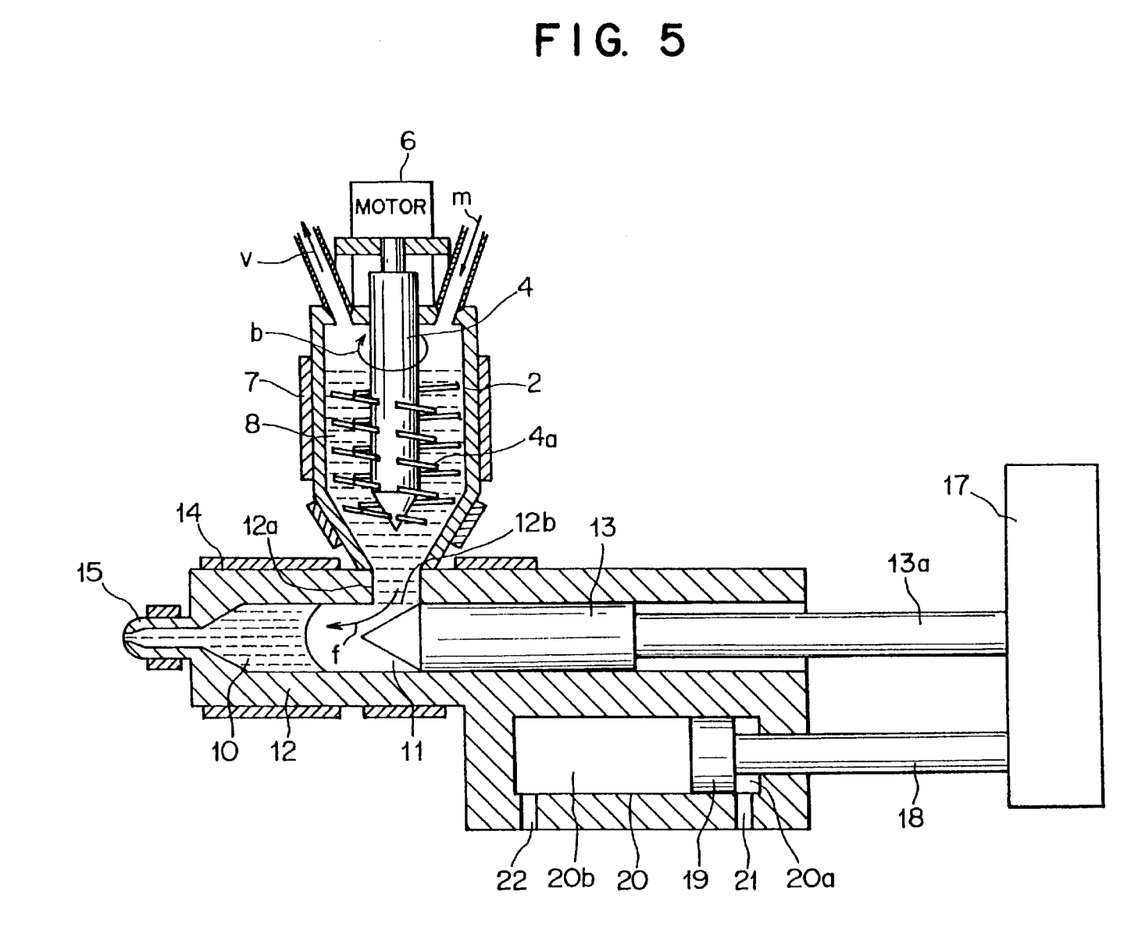
FIG. 5 is a cross-sectional view depicting a state upon transfer of a resin in the injection unit according to the embodiment.
Figure 8:
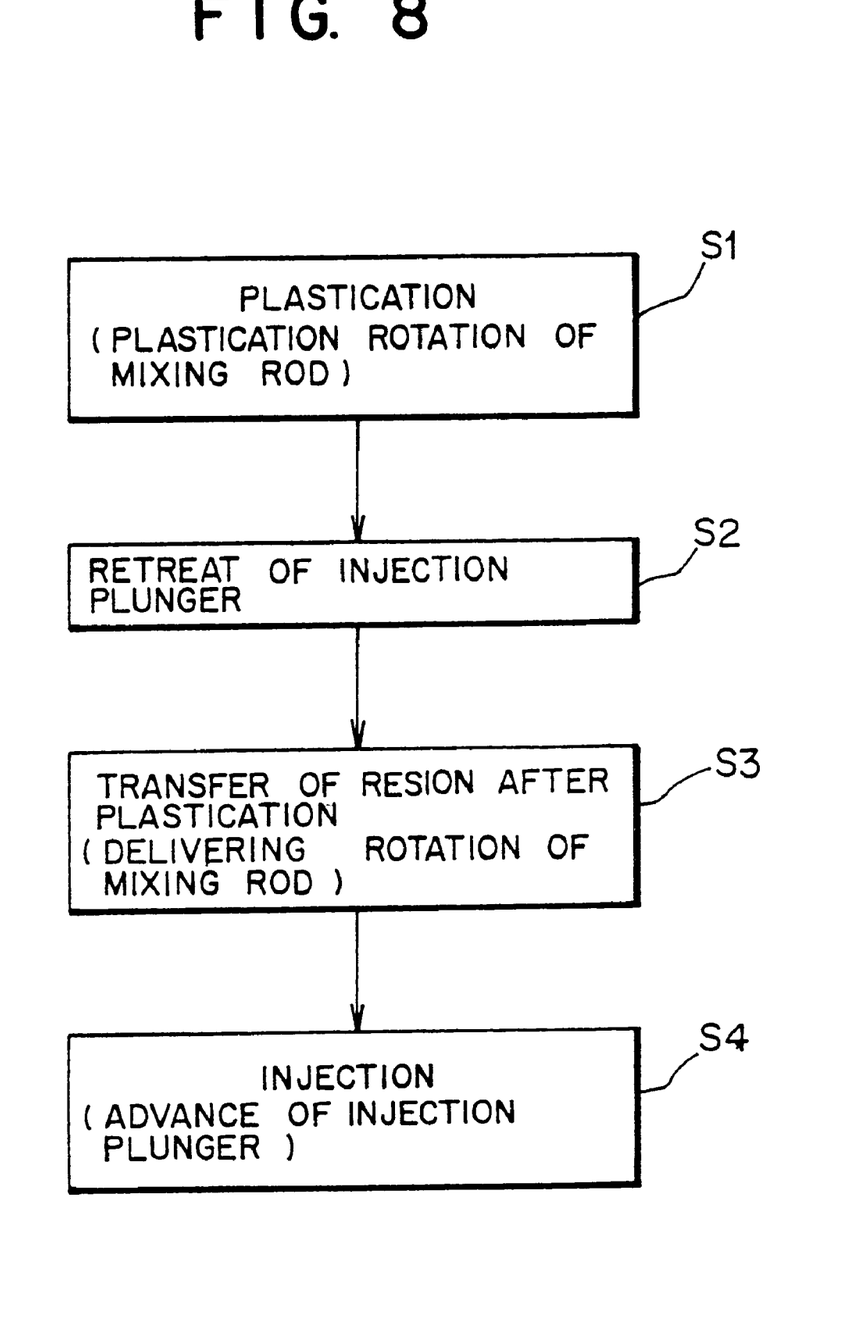
FIG. 8 is a flow diagram describing work steps by the injection unit of the embodiment.

FIG. 5 illustrates a resin transfer step. After the resin 8 has been plasticized as shown in FIG. 8, the injection plunger 13 is arranged at a position retreated from the advanced position shown in FIG. 4, whereby the resin inlet 12b is opened. As a consequence, the resin 8 which has been plasticized in the plasticizing tank 2 is fed into the empty space 11 located at the point forward of the injection plunger 13 by way of the communication passage 12a and the resin inlet 12b, as indicated by arrow f. At this time, the mixing rod 4 is driven by the motor 6 in the direction of arrow b, as viewed in FIG. 5, and the resin 8 is transferred downwardly by the feeding action of the helical fins 4a.

Figure 6:
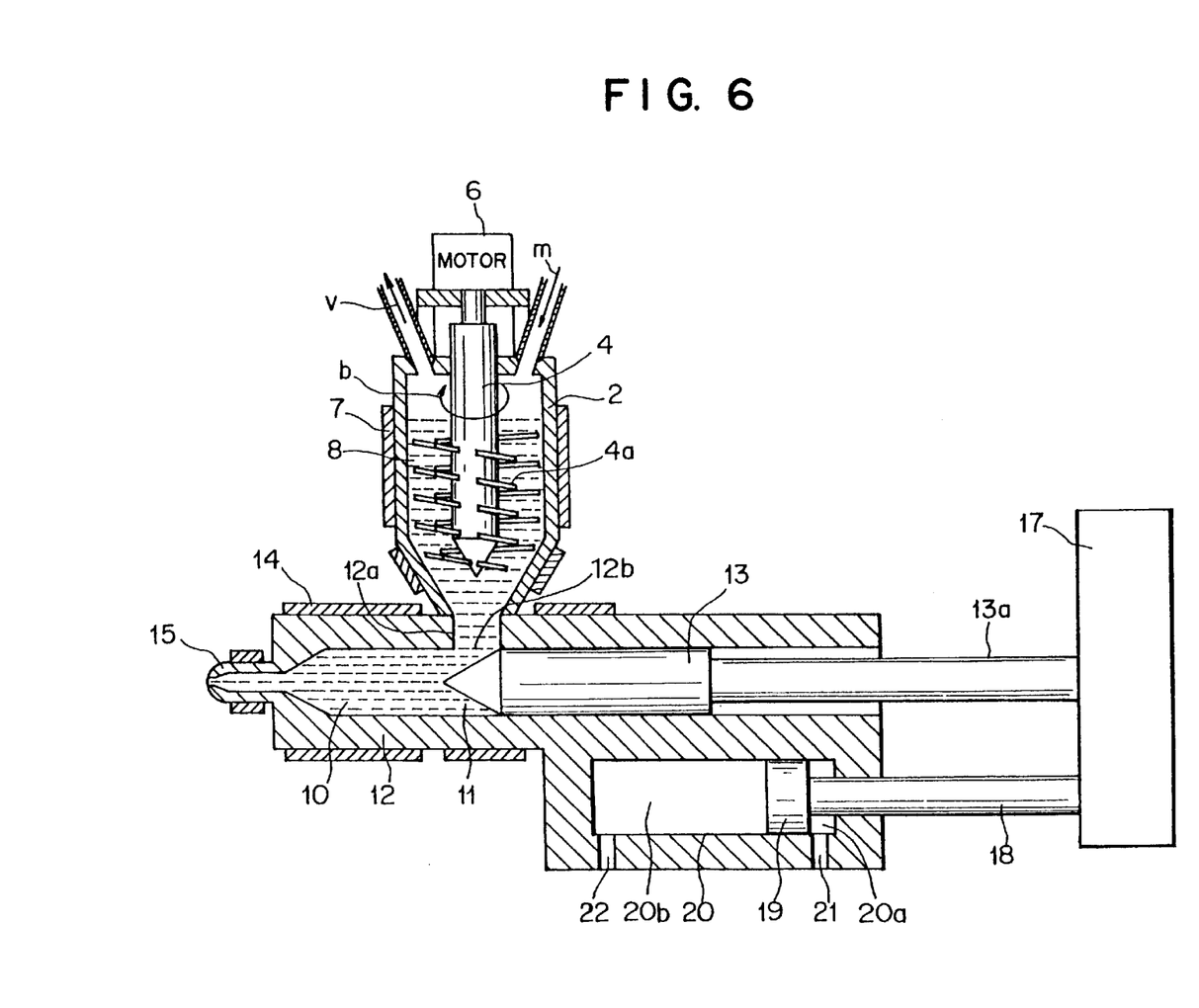
FIG. 6 is a cross-sectional view showing a state upon initiation of injection in the injection unit according to the embodiment.

FIG. 6 depicts a state upon initiation of injection. As has been described above, the resin 8 has been fed from the plasticizing tank 2, and the injection cylinder 12 is filled up with the molten resin 10. Incidentally, the rotation of the mixing rod 4 is stopped exactly when the injection cylinder 12 has been filled up with the molten resin 10.

Figure 7:
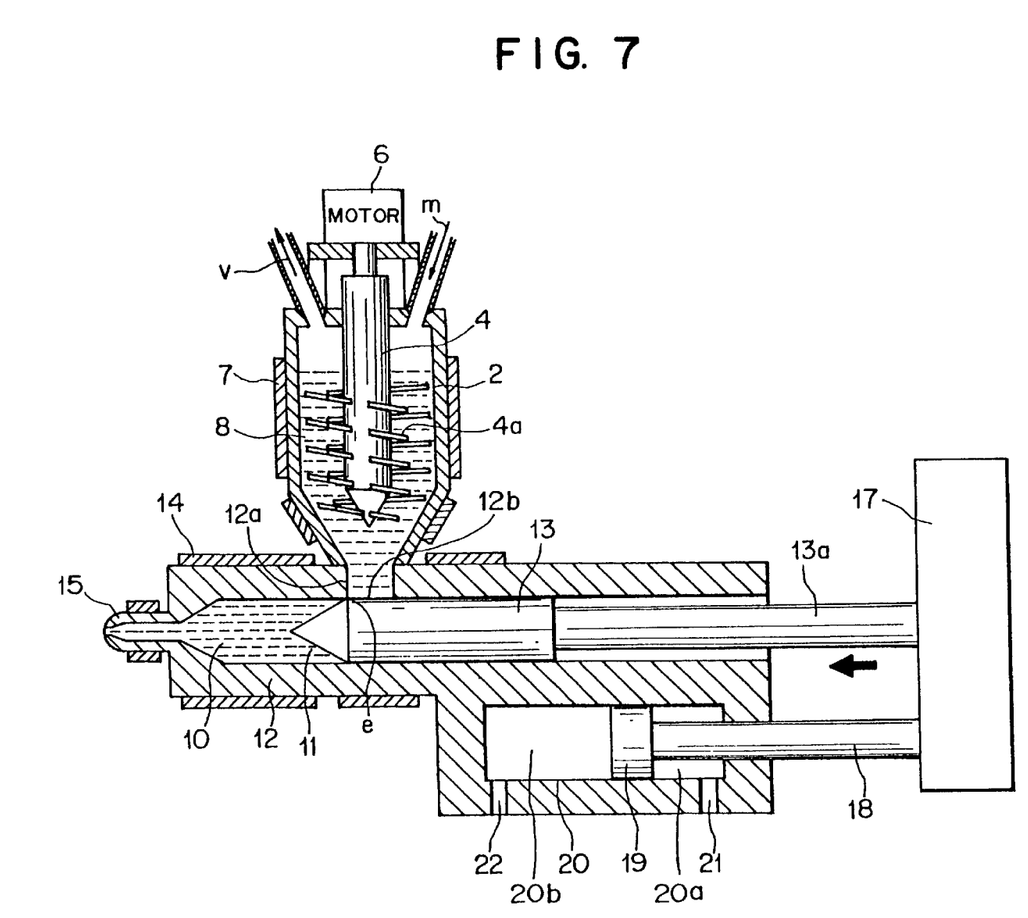
FIG. 7 is a cross-sectional view showing a state upon initiation of sealing of a resin, which is to be injected, in the injection unit according to the embodiment.

FIG. 7 shows a state upon initiation of sealing of the resin to be injected. In the injection step, the injection plunger 13 is driven forward by the action of the hydraulic cylinder 20 to inject the molten resin 10 into the mold (not shown) through the nozzle 15. When the injection plunger 13 advances a little at this time, the resin inlet 12b is closed by the injection plunger 13. Accordingly, the resin will then remain sealed between the injection plunger 13 and the injection cylinder 12 until the injection step is completed from the state shown in FIG. 7 and the injection plunger 13 advances to the position shown in FIG. 4. The molten resin 10 located forward of the injection plunger 13 is therefore injected through the nozzle 15 without flowing backward to a rear part of the plunger 13 (into the plasticizing tank 2).

It is FIG. 8 that illustrates the above-described changes in steps in the form of a flow diagram. As is shown in FIG. 8, plasticizing is first conducted by rotating the mixing rod 4 for a desired time in the state that the resin inlet 12b is closed by the injection plunger 13 (step S1); upon completion of the plasticizing, the injection plunger 13 is caused to retreat over an appropriate distance to open the resin inlet 12b (step S2); upon completion of the retreat, the plasticized resin 8 is transferred from the plasticizing tank 2 into the injection cylinder 12 (step S3); and upon completion of the transfer, that is, when the injection cylinder 12 is filled up by the molten resin 10, the injection plunger 13 is caused to advance to perform injection (step S4). Such operations of the steps S1 to S4 are repeated. Of course, the individual steps shown in this flow diagram are performed while controlling their timing in association with mold opening/closing operations of a clamping device.

According to the injection unit of the embodiment of the present invention, the connection of the plasticizing tank 2, which has the built-in mixing rod 4 with the numerous fins 4a arranged extending from the mixing rod, to the injection cylinder 12 makes it possible, as has been described above, to cause a feed resin, which has been fed into the plasticizing tank 2, to melt by mixing it for a required time with the mixing rod 4 and then to feed the molten resin into the injection cylinder 12 and to accumulate it there by rotation of the mixing rod 4.

Namely, the feed resin is simply mixed within the plasticizing tank 2 during plasticizing, and the passage through which the resin flows after the plasticizing does not include any part of large flow resistance like a conventional check ring (see the element at numeral 116 in FIG. 12). In the case of a resin added with a powdery filler, the flow passage is therefore not clogged by the powdery filler and, because the resin is not fed during plasticizing unlike the conventional art, the plasticizing ability is not lowered for the inclusion of the powdery filler. It is therefore possible to easily plasticize and mold even a feed resin containing a lot of a powdery filler, such as woodflour or coal ash. A feed resin added with a powdery filler at a high concentration, the molding of which has heretofore been difficult, can thus be used, thereby making it possible to lower the feed cost and also to provide a molded product with substantially-improved physical properties.

In the case of a resin filled with long fibers, on the other hand, cutting of the long fibers can be avoided because shear force, such as that produced by a conventional plasticizing screw (see the element at numeral 104 in FIG. 12), does not act on the long fibers and flow resistance, such as that associated by a check ring, does not occur. Accordingly, a molded product can contain longer fibers and can hence be provided with substantially-improved strength.

As has been described above, the use of the injection unit of this embodiment permits easy molding of a feed resin added with a powdery filler at a high concentration or filled with longer fibers although such a feed resin causes problems if the conventional injection units are used. The injection unit of this embodiment therefore makes it possible to use a feed resin of lower cost than the conventional injection units, thereby permitting a substantial reduction in the cost of a product. In addition, the injection unit of this embodiment is suited for molding a resin added with a powdery filler. Accordingly, it can also be used, without problems, upon molding a raw material which is available by crushing resin products, thereby facilitating recycling of feed resins.

Because plasticizing can be performed for a desired time within the plasticizing tank 2, it is possible to conduct plasticizing for a period as long as needed according to a resin even if the resin is replaced by another resin of different type. It is therefore no longer necessary to change a part of the unit according to the resin type and, moreover, to use such a long screw as that needed to date. This has made it possible to shorten the injection cylinder 12 and hence to substantially reduce the machine length of the injection unit, thereby permitting a reduction in a space that is required for the installation of the unit.

Further, the provision of the vent hole 26 in the upper part of the plasticizing tank 2 makes it possible to release evaporated gas, which occurs upon plasticizing, to the outside through the vent hole 26. It is therefore possible to assure avoidance of occurrence of defects, such as bubbles and/or burn marks, on a molded product even when a feed resin containing a gas-evaporating component such as woodflour, is used.

As a control method upon operation of this unit, the resin inlet 12b from the plasticizing tank 2 into the injection cylinder 12 may be closed by the outer peripheral part of the injection plunger 13 during plasticizing and, when feeding the resin 8 from the plasticizing tank 2 into the injection cylinder 12, the injection plunger 13 may be caused to retreat to open the resin inlet 12b. This control method makes it possible to plasticize the resin inside the plasticizing tank 2 for a period as long as desired upon plastication without feeding it to the injection cylinder 12 and, after the plasticizing, to easily feed the resin 8 from the plasticizing tank 2 into the injection cylinder 12 to perform injection molding without problems.

Concerning the direction of rotation of the mixing rod 4 within the plasticizing tank 2, the rotation of the mixing rod 4 in the manner that the helical fins 4a feed the resin 8 in the direction opposite to the injection cylinder 12 upon plasticizing and the fins 4a feed the resin 8 toward the injection cylinder 12 upon feeding the resin 8 from the plasticizing tank 2 into the injection cylinder 12 makes it possible to maintain a balance during plasticizing between the upward feed of the resin 8 by the fins 4a and the downward reverse flow of the resin 8 between the fins 4a (through the cut-off portions 4b) so that the resin 8 can be adequately mixed, and also makes it possible to reverse the mixing rod 4 after the plasticizing so that the resin 8 can be easily fed from the plasticizing tank 2 into the injection cylinder 12 by the action of the fins 4a.

In the above-described embodiment, the mixing rod 4 is rotated in the direction of arrow a in the plasticizing step as shown in FIG. 4 so that the helical fins 4a feed the resin 8 in the direction opposite to the injection cylinder 12 (the upward direction). As an alternative, the direction of rotation of the mixing rod 4 may be reversed (into the direction of arrow b) in the plasticizing step as depicted in FIG. 9.

Figure 9:
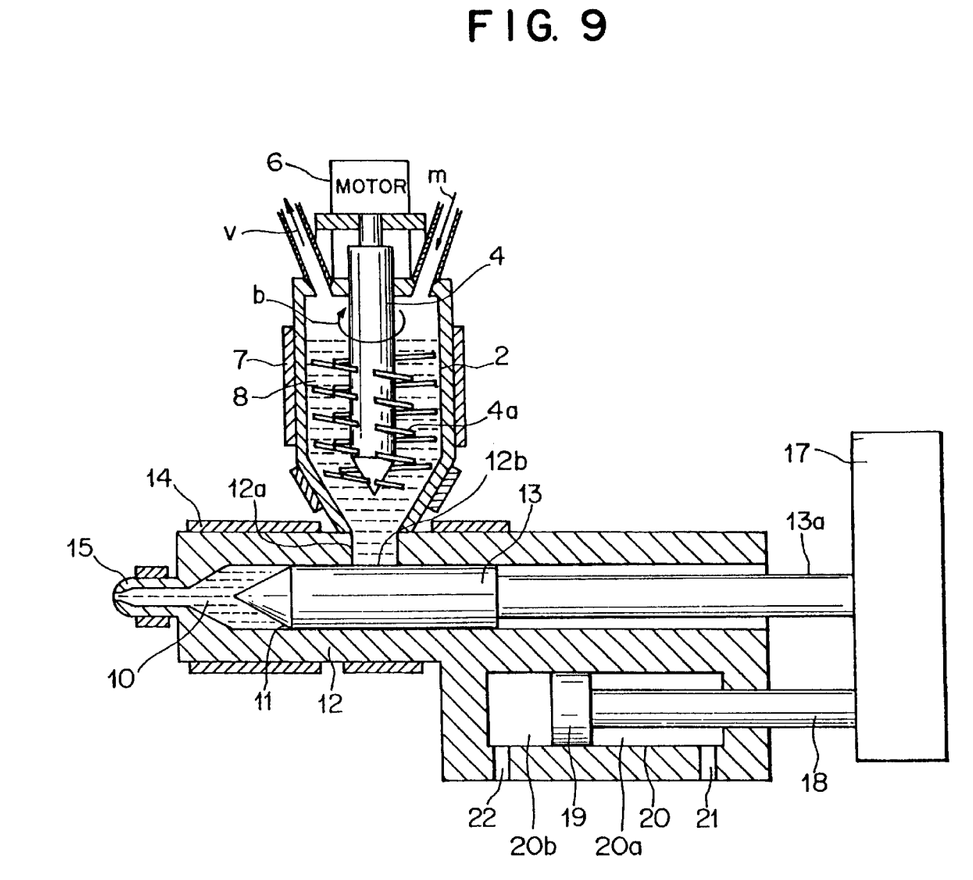
FIG. 9 is a cross-sectional view showing a modification of an operation (rotation of a mixing rod upon plasticizing) by the embodiment.

In this case, the mixing rod 4 is driven in the direction of arrow b to downwardly feed the resin 8 from the plasticizing tank 2 as shown in FIG. 9. However, the resin inlet 12b is closed by the injection plunger 13. The resin 8 therefore cannot flow downward (into the injection cylinder 2), so that the resin 8 is compressed by the helical fins 4a. The pressure of the resin 8 therefore increases, thereby assuring the prevention of occurrence of evaporated gas in the resin 8 or the avoidance of formation of bubbles due to mixing of the external air.

Figure 10:
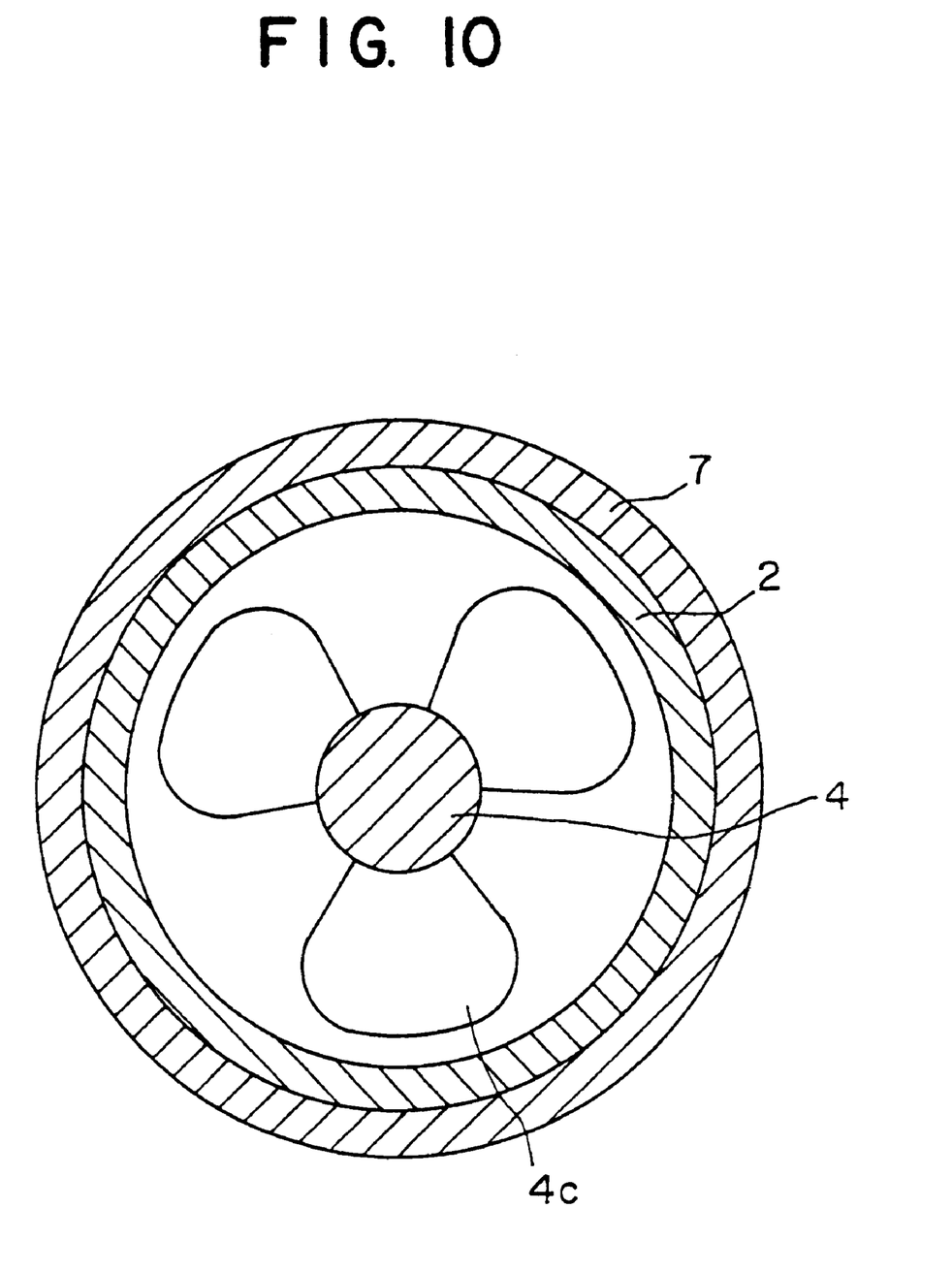
FIG. 10 is a drawing (a cross-sectional view taken at a position corresponding to FIG. 3) illustrating a modification of fins of the mixing rod in the injection unit according to the embodiment.
Figure 11:
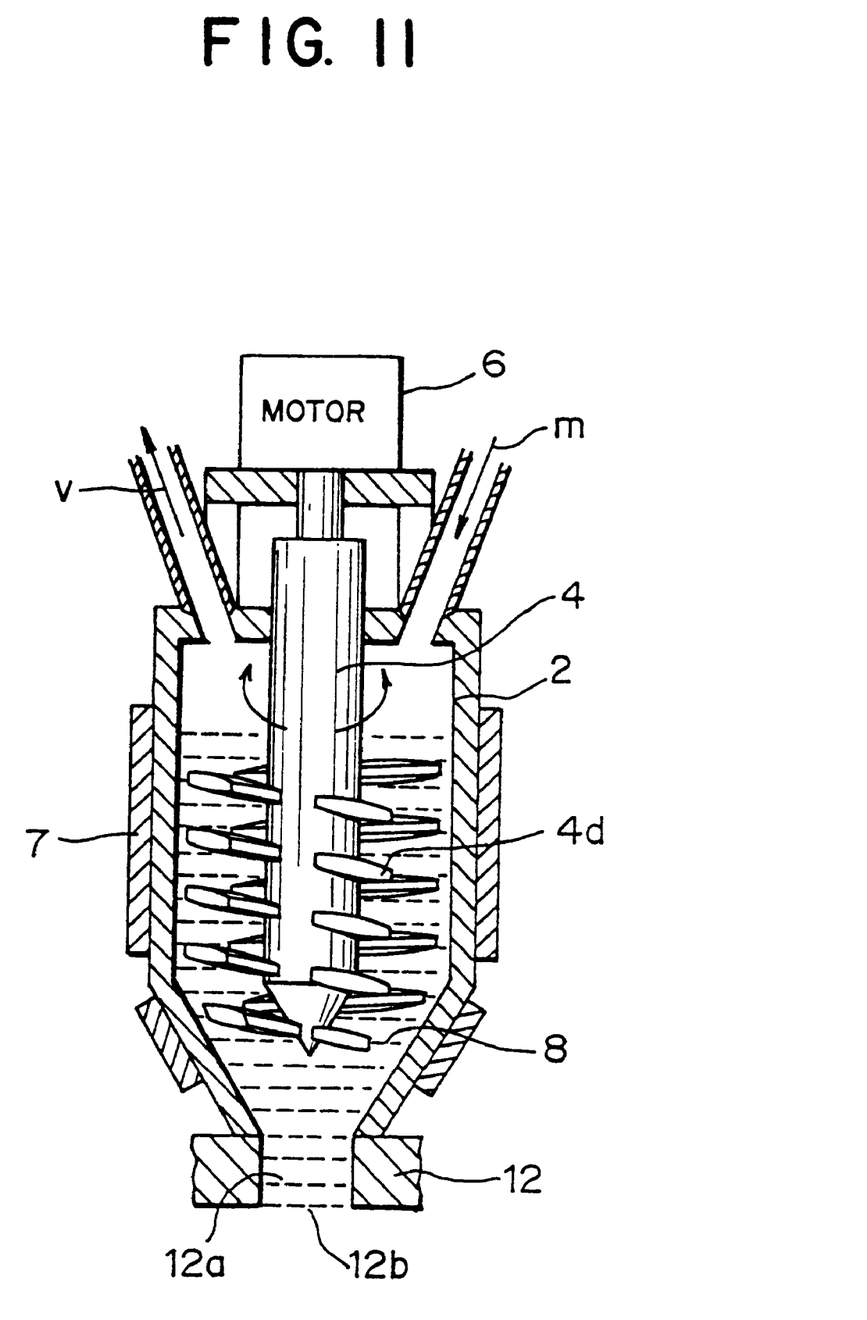
FIG. 11 is a cross-sectional view (a cross-sectional view taken at a position corresponding to FIG. 2) depicting a plasticizing container equipped with fins of another modification of the fins of the mixing rods in the injection unit according the embodiment in order to describe the another modification.

In the above-mentioned embodiment, the helical fins 4a which are each in a planar form are arranged as many as four per full turn. The present invention should however not be limited to such an embodiment. For example, three blades 4c may be arranged per helical pitch, all extending from the mixing rod 4 as shown in FIG. 10. Each blade 4c can be formed to lie in a desired curved plane. Further, as is illustrated in FIG. 11, helical fins 4d which are arranged extending from the mixing rod 4 can be changed in cross-sectional thickness so that they present a wing-like shape. As has been indicated above, the number and shape of fins arranged extending from the mixing rod 4 can be designed as desired so that they become suited for the mixing of a resin within the plasticizing tank 2 and for the downward transfer of the resin (toward the injection cylinder 12). Irrespective of the number and shape of the fins, they can bring about similar advantages as those of the above-described embodiment.

What is claimed is:

1. An injection unit for an injection molding machine, comprising:

a plasticizing tank having a built-in mixing rod with numerous fins arranged around, and projecting from, said mixing rod to define spaces between the successive fins, said mixing rod being rotatable in either direction or both directions for plasticizing a feed resin as the feed resin is partially allowed to pass through the spaces between the successive fins by gravity; and an injection cylinder connected to, and communicating with, said plasticizing tank for receiving the plasticized feed resin from said plasticizing tank, said injection cylinder having a built-in injection plunger longitudinally movable toward and away from a mold for injecting the feed resin in plasticized form received from said plasticizing tank into a mold.

2. The injection unit according to claim 1, wherein said plasticizing tank has in an upper part thereof a vent for allowing gas, originating from the feed resin, to escape out of said plasticizing tank.

3. The injection unit according to claim 2, wherein said plasticizing tank has a passageway to said injection cylinder which passageway is opened and closed in response to the reciprocating movement of said injection plunger in said injection cylinder.

4. The injection unit according to claim 3, wherein said mixing rod is rotated during plasticizing of the feed resin in such a manner that said fins move the plasticized feed resin toward said injection cylinder to facilitate eliminating possible bubbles in the feed resin while said passageway of said plasticizing tank is closed by said injection plunger.

5. The injection unit according to claim 1, wherein said plasticizing tank has a passageway to said injection cylinder which passageway is opened and closed in response to the reciprocating movement of said injection plunger in said injection cylinder.

6. The injection unit according to claim 5, wherein said mixing rod is rotated during plasticizing of the feed resin in such a manner that said fins move the plasticized feed resin toward said injection cylinder to facilitate eliminating possible bubbles in the feed resin while said passageway of said plasticizing tank is closed by said injection plunger.

7. An injection unit for an injection molding machine, comprising:
- a plasticizing tank having a built-in mixing rod, with numerous fins arranged around and projecting from said mixing rod, said mixing rod being rotatable in either direction or both directions for plasticizing a feed resin; and
- an injection cylinder connected to, and communicating with, said plasticizing tank for receiving the plasticized feed resin from said plasticizing tank, said injection cylinder having a built-in injection plunger longitudinally movable toward and away from a mold for injecting the feed resin in plasticized form received from said plasticizing tank into the mold;
- said mixing rod being rotatable during plasticizing of the feed resin in such a manner that said fins stir the feed resin in a direction opposite to said injection cylinder, and being also movable, during feeding of the plasticized feed resin, in such a manner that said fins facilitate moving the plasticized feed resin toward said injection cylinder.

8. An injection unit for an injection molding machine, comprising:
- a plasticizing tank having a built-in mixing rod, with numerous fins arranged around, and projecting from, said mixing rod, said mixing rod being rotatable in either direction or both directions for plasticizing a feed resin; and
- an injection cylinder connected to, and communicating with, said plasticizing tank for receiving the plasticized feed resin from said plasticizing tank, said injection cylinder having a built-in injection plunder longitudinally movable toward and away from a mold for injecting the feed resin in plasticized form received from said plasticizing tank into the mold;
- said mixing rod being rotatable, during plastication of the feed resin, in such a manner that said fins stir the feed resin in a direction opposite to said injection cylinder, and being also movable during feeding of the feed resin in such a manner that said fins move the plasticized feed resin toward said injection cylinder;
- said plasticizing tank having in an upper part thereof a vent for allowing gas, originating from the feed resin, to escape out of said plasticizing tank.

9. An injection unit for an injection molding machine, comprising:
- a plasticizing tank having a built-in mixing rod, with numerous fins arranged around, and projecting from, said mixing rod, said mixing rod being rotatable in either direction or both directions for plasticizing a feed resin; and
- an injection cylinder connected to, and communicating with, said plasticizing tank for receiving the plasticized feed resin, said injection cylinder having a built-in injection plunger longitudinally movable toward and away from a mold for injecting the feed resin in plasticized form received from said plasticizing tank into the mold;
- said plasticizing tank having a passageway to said injection cylinder which passageway is opened and closed in response to the reciprocating movement of said injection plunger in said injection cylinder;
- said mixing rod being rotatable during plastication of the feed resin in such a manner that said fins stir the feed resin in a direction opposite to said injection cylinder, and being also movable during feeding of the feed resin in such a manner that said fins move the plasticized feed resin toward said injection cylinder.

10. An injection unit for an injection molding machine, comprising:
- a plasticizing tank having a built-in mixing rod, with numerous fins arranged around, and projecting from, said mixing rod, said mixing rod being rotatable in either direction or both directions for plasticizing a feed resin; and
- an injection cylinder connected to, and communicating with, said plasticizing tank for receiving the plasticized feed resin from said plasticizing tank, said injection cylinder having a built-in injection plunger longitudinally movable toward and away from a mold for injecting the feed resin in plasticized form received from said plasticizing tank into the mold;
- said plasticizing tank having a passageway to said injection cylinder which passageway is opened and closed in response to the reciprocating movement of said injection plunger in said injection cylinder;
- said mixing rod being rotatable, during plasticizing of the feed resin, in such a manner that said fins stir the feed resin in a direction opposite to said injection cylinder, and being also movable during feeding of the plasticized feed resin in such a manner that said fins move the plasticized feed resin toward said injection cylinder;
- said plasticizing tank having in an upper part thereof a vent for allowing gas, originating from the feed resin, to escape out of said plasticizing tank.

* * * * *